United States Patent
Zhu et al.

(10) Patent No.: US 8,838,322 B1
(45) Date of Patent: Sep. 16, 2014

(54) SYSTEM TO AUTOMATICALLY MEASURE PERCEPTION SENSOR LATENCY IN AN AUTONOMOUS VEHICLE

(75) Inventors: Jiajun Zhu, Sunnyvale, CA (US); David I. Ferguson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 227 days.

(21) Appl. No.: 13/585,486

(22) Filed: Aug. 14, 2012

(51) Int. Cl.
*G01C 22/00* (2006.01)

(52) U.S. Cl.
USPC .................... 701/26; 348/46; 342/71

(58) Field of Classification Search
USPC ............................. 701/1, 26; 348/46
See application file for complete search history.

(56) References Cited

U.S. PATENT DOCUMENTS

| | | | | |
|---|---|---|---|---|
| 5,559,695 | A * | 9/1996 | Daily .............................. | 701/1 |
| 8,380,425 | B2 * | 2/2013 | Duggan et al. ................. | 701/301 |
| 8,521,352 | B1 * | 8/2013 | Ferguson et al. ............... | 701/25 |
| 2007/0093945 | A1 * | 4/2007 | Grzywna et al. ................ | 701/23 |
| 2010/0235129 | A1 * | 9/2010 | Sharma et al. .................. | 702/97 |
| 2010/0332136 | A1 * | 12/2010 | Duggan et al. ................. | 701/301 |
| 2011/0251755 | A1 * | 10/2011 | Widmann ....................... | 701/36 |
| 2012/0182392 | A1 * | 7/2012 | Kearns et al. .................. | 348/46 |
| 2013/0321627 | A1 * | 12/2013 | Turn et al. ..................... | 348/148 |

FOREIGN PATENT DOCUMENTS

WO  2011073085 A1  6/2011

* cited by examiner

*Primary Examiner* — Helal A Algahaim
*Assistant Examiner* — Shardul Patel
(74) *Attorney, Agent, or Firm* — McDonnell Boehnen Hulbert & Berghoff LLP

(57) ABSTRACT

A vehicle may operate in an autonomous mode in an environment during a test period. The vehicle may include at least one sensor coupled to the vehicle, configured to acquire sensor data during the test period. The sensor data may include data representative of a target object in the environment. The vehicle may operate the sensor to obtain the sensor data. The vehicle may define a movement of the vehicle, determine a predicted movement of the target object in the sensor data based on the defined movement, initiate the defined movement of the vehicle at an initiation time during the test period, complete the defined movement of the vehicle at a completion time during the test period, analyze the sensor data obtained during the test period, and determine a latency of the at least one sensor based on the analyzed data.

20 Claims, 8 Drawing Sheets

US 8,838,322 B1

SYSTEM TO AUTOMATICALLY MEASURE PERCEPTION SENSOR LATENCY IN AN AUTONOMOUS VEHICLE

BACKGROUND

Unless otherwise indicated herein, the materials described in this section are not prior art to the claims in this application and are not admitted to be prior art by inclusion in this section.

Some vehicles are configured to operate in an autonomous mode in which the vehicle navigates through an environment with little or no input from a driver. Such a vehicle typically includes one or more sensors that are configured to sense information about the environment. The vehicle may use the sensed information to navigate through the environment. For example, if the sensors sense that the vehicle is approaching an obstacle, the vehicle may navigate around the obstacle.

SUMMARY

In a first aspect, a method is provided. The method includes obtaining, during a test period, sensor data from at least one sensor of a vehicle. The vehicle is operating in an autonomous mode controlled by a computer system during the test period. The sensor data includes data representative of a target object in an environment of the vehicle. The vehicle has a first pose in the environment at a beginning of the test period. The method includes defining a movement of the vehicle from the first pose to a second pose. The method also includes determining a predicted movement of the at least one target object in the sensor data based on the defined movement of the vehicle. The method additionally includes initiating the defined movement of the vehicle at an initiation time during the test period. The method further includes completing the defined movement of the vehicle at a completion time during the test period. The method yet further includes analyzing the sensor data obtained during the test period to identify at least one of (i) a start time when the at least one target object begins the predicted movement in the sensor data and (ii) a stop time when the at least one target object stops the predicted movement in the sensor data. The method yet even further includes determining a latency of the at least one sensor based on at least one of (i) a difference between the start time and the initiation time and (ii) a difference between the stop time and the completion time.

In a second aspect, a vehicle is provided. The vehicle includes at least one sensor coupled to the vehicle configured to acquire sensor data during a test period. The vehicle is configured to operate in an autonomous mode during the test period, the sensor data includes data representative of a target object in an environment of the vehicle, and the vehicle has a first pose in the environment at a beginning of the test period. The vehicle also includes a computer system. The computer system is configured to operate the at least one sensor and the vehicle in the autonomous mode to obtain the sensor data. The computer system is configured to define a movement of the vehicle from the first pose to a second pose. The computer system is also configured to determine a predicted movement of the at least one target object in the sensor data based on the defined movement of the vehicle. The computer system is additionally configured to initiate the defined movement of the vehicle at an initiation time during the test period. The computer system is further configured to complete the defined movement of the vehicle at a completion time during the test period. The computer system is yet further configured to analyze the sensor data obtained during the test period to identify at least one of (i) a start time when the at least one target object begins the predicted movement in the sensor data and (ii) a stop time when the at least one target object stops the predicted movement in the sensor data. The computer system is yet even further configured to determine a latency of the at least one sensor based on at least one of (i) a difference between the start time and the initiation time and (ii) a difference between the stop time and the completion time.

In a third aspect, a non-transitory computer readable medium having stored therein instructions executable by a computer system to cause the computer system to perform functions is provided. The functions include obtaining, during a test period, sensor data from at least one sensor of a vehicle. The vehicle is operating in an autonomous mode during the test period, the sensor data includes data representative of a target object in an environment of the vehicle, and the vehicle has a first pose in the environment at a beginning of the test period. The functions include defining a movement of the vehicle from the first pose to a second pose. The functions also include determining a predicted movement of the at least one target object in the sensor data based on the defined movement of the vehicle. The functions additionally include initiating the defined movement of the vehicle at an initiation time during the test period. The functions further include completing the defined movement of the vehicle at a completion time during the test period. The functions yet further include analyzing the sensor data obtained during the test period to identify at least one of (i) a start time when the at least one target object begins the predicted movement in the sensor data and (ii) a stop time when the at least one target object stops the predicted movement in the sensor data. The functions yet even further include determining a latency of the at least one sensor based on at least one of (i) a difference between the start time and the initiation time and (ii) a difference between the stop time and the completion time.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
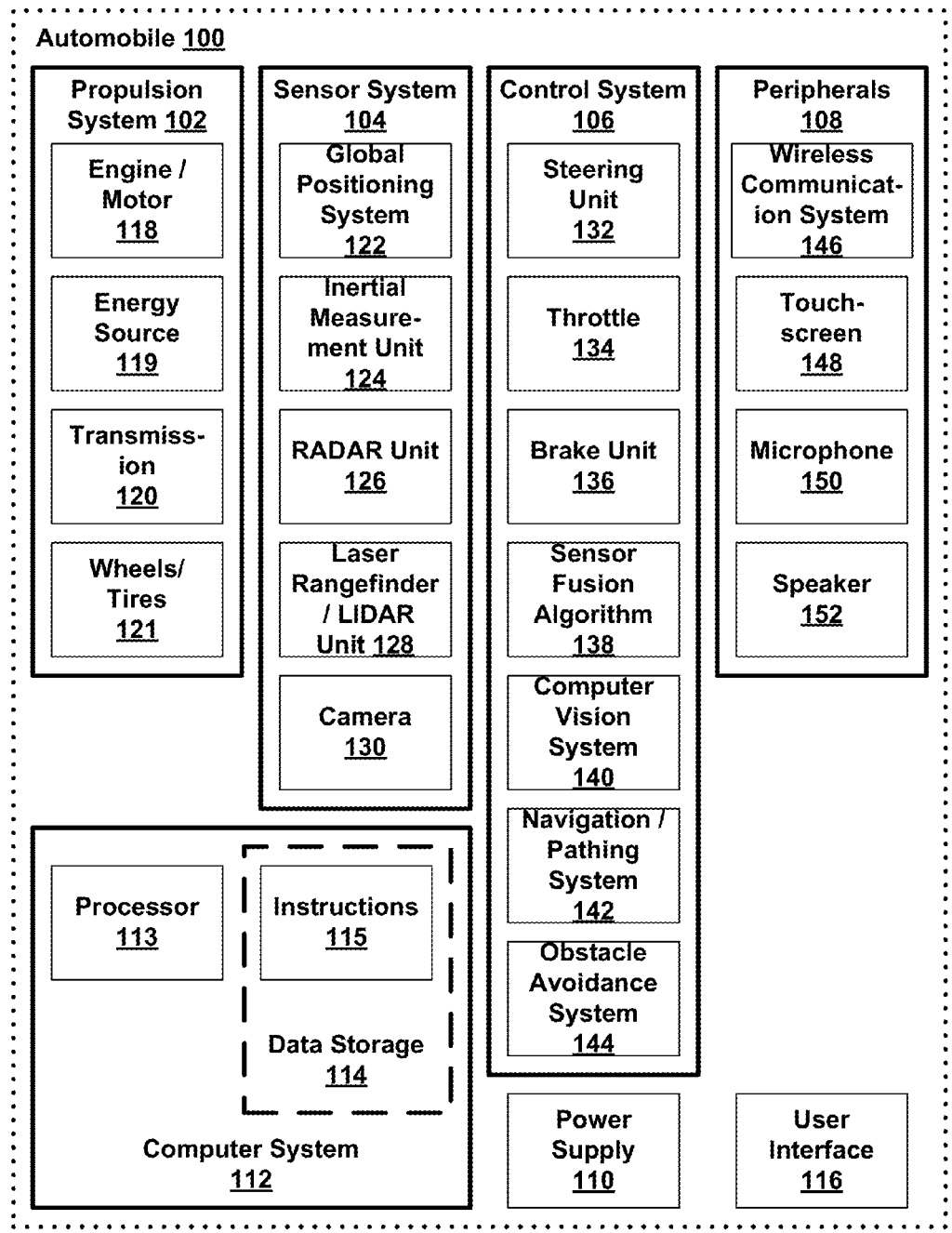
FIG. 1 is a functional block diagram illustrating a vehicle, in accordance with an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

A key component of a vehicle driving in an autonomous mode is its perception system, which allows the vehicle to perceive and interpret its surroundings while driving. To do so, the vehicle driving in the autonomous mode may use various sensors such as a laser or a radar to facilitate its movement throughout an environment. Each sensor may be controlled by parameters to both operate and communicate with other sensors. One important parameter is sensor latency. Sensors may have unknown latency and this latency may change over time (possibly unknowingly and operating-condition dependent). Such latency may cause errors in real-time perception of the environment by the vehicle. Tracking and measuring sensor latency ensures the vehicle can optimize its sensors to more consistently and accurately detect objects and surroundings of the environment of the vehicle.

This disclosure relates to automatically determining the latency of sensors coupled to a vehicle operating in an autonomous mode, based on an analysis of (i) movements of the vehicle in an environment, and (ii) predicted movements of a target object within sensor data obtained by at least one sensor coupled to the vehicle. The movements of the target object may be predicted based on the movements of the vehicle.

Example embodiments disclosed herein include operating a vehicle having at least one sensor in an autonomous mode in an environment, where the sensor is coupled to the vehicle and configured to obtain sensor data during a test period, where the vehicle has a first pose in the environment at the beginning of the test period, and where the sensor data includes data representative of a target object in the environment of the vehicle; defining a movement of the vehicle from the first pose to a second pose; determining a predicted movement of the at least one target object in the sensor data based on the defined movement of the vehicle; initiating the defined movement of the vehicle at an initiation time during the test period; completing the defined movement of the vehicle at a completion time during the test period; analyzing the sensor data obtained during the test period to identify at least one of (i) a start time when the at least one target object begins the predicted movement in the sensor data and (ii) a stop time when the at least one target object stops the predicted movement in the sensor data; and determining a latency of the at least one sensor based on at least one of (i) a difference between the start time and the initiation time and (ii) a difference between the stop time and the completion time.

Within the context of the disclosure, the vehicle may be operable in various modes of operation. Depending on the embodiment, such modes of operation may include manual, semi-autonomous, and autonomous modes. In particular, the autonomous mode may provide steering operation with little or no user interaction. Manual and semi-autonomous modes of operation could include greater degrees of user interaction.

Some methods described herein could be carried out in part or in full by a vehicle configured to operate in an autonomous mode with or without external interaction (e.g., such as from a user of the vehicle). In one example, the vehicle may operate in an autonomous mode having at least one sensor and a first pose in an environment during a test period. The environment may include a target object. The at least one sensor may be coupled to the vehicle and configured to obtain sensor data. The sensor data may include data representative of the target object. For example, the vehicle may be traveling down a freeway at a speed of 50 miles-per-hour with another vehicle driving in front of it with a zero degree heading (i.e., a straight north heading) (hereinafter "the freeway example"). The vehicle may continuously or periodically obtain sensor data while operating in this pose. The vehicle may detect the other vehicle driving in front of it using a radar, for example. In one instance, the vehicle may use the radar to ensure the vehicle knows where and how far the other vehicle is in relation to itself. Other sensors may be used to detect the other vehicle, and other data may be obtained from the sensor. As the vehicle continues to travel, the vehicle may define a movement of the vehicle from a first pose to a second pose. In one example, the defined movement may correspond to changing lanes. However, many other reasons may exist to cause the vehicle to define a movement and are contemplated herein. For example, the vehicle may need to accelerate, make a turn, or stop. In other examples, the vehicle may define a movement based on user input. Continuing with the freeway example, the vehicle may determine that it needs to change lanes because the other vehicle it is detecting with its radar is beginning to slow down. To do so, the vehicle may determine the defined movement to be a change in the heading of the vehicle from a zero-degree heading to a negative-fifteen degree heading. Other movements may be defined.

Once the vehicle defines a movement, the vehicle may determine a predicted movement of at least one target object within the sensor data based on the defined movement of the vehicle. In other words, the vehicle may predict a movement of objects as detected by its sensors based on its own movements. In the foregoing freeway example, the vehicle may determine that the other vehicle driving in front of it may be perceived by the radar to move in an opposite lateral direction when the vehicle begins to change its heading. In this example, the predicted movement would be the other vehicle moving in an opposite lateral direction. After determining a predicted movement of a target object in the sensor data, the vehicle may initiate and complete the defined movement. In other words, the vehicle may actually complete the movement during the test period. For instance, referring to the freeway example, the vehicle may change the steering of the vehicle thereby causing the vehicle to change its heading. The vehicle may track the initiation time (when the vehicle initiates the movement) and the completion time (when the vehicle completes the defined movement). As the vehicle initiates and completes its defined movement, the vehicle may obtain new sensor data. In the freeway example, as the vehicle changes its speed and heading, the radar may detect a movement of the other vehicle on the freeway, for example. In other examples, the vehicle may also detect other, new vehicles directly in front of it based on its new heading. The vehicle may also detect objects or things other than vehicles. In some instances, the vehicle may not detect any new objects or things after changing its heading.

Once the vehicle has completed the defined movement, the vehicle may analyze the sensor data to determine a time at which the target object began the predicted movement, if any, and a stop time when the target object stopped the predicted movement. For example, if the vehicle were utilizing a camera sensor, the vehicle may analyze the data (e.g., images) obtained by the camera and determine if the object captured in the data depicts the predicted movement, and if so, at what time during the test period the predicted movement began and stopped. Other methods to analyze the data are possible and contemplated herein. In the freeway example, the vehicle may, for example, analyze the data obtained from the radar and plot movement data on a graph to determine the movement and movement times of the other vehicle. After the sensor data has been analyzed the vehicle may determine any latency of the sensor based on the analysis. Using the movement times of the vehicle and the target object, the vehicle may, determine latency of the sensor by calculating a difference in one or more of (i) the start time and the initiation time, and (ii) the competition time and the stop time. Calculating latency of the sensors of the vehicle allows the vehicle to optimize the sensors, thereby causing the sensors to obtain sensor data that more accurately reflects what is actually happening in the environment of the vehicle.

Vehicles are also described in the present disclosure. In one embodiment the vehicle may include elements including at least one sensor coupled to the vehicle configured to acquire sensor data, and a computer system. The computer system may be configured to perform various functions. The functions may include operating the at least one sensor and the vehicle in the autonomous mode. The functions may also include varying the first pose of the vehicle to create a second pose of the vehicle. The functions may additionally include determining a latency of the at least one sensor coupled to the vehicle based on one or more of the first pose of the vehicle, the second pose of the vehicle, and the sensor data.

Also disclosed herein is a non-transitory computer readable medium with stored instructions. The stored instructions may be executable by a computing device to cause the computing device to perform functions similar to those described in the aforementioned methods.

There are many different specific methods and systems that could be used to effectuate the methods and systems described herein. Each of these specific methods and systems are contemplated herein, and several example embodiments are described below.

Example systems within the scope of the present disclosure will now be described in greater detail. Generally, an example system may be implemented in or may take the form of an automobile (i.e., a specific type of vehicle). However, an example system may also be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

Referring now to the figures, FIG. 1 is a functional block diagram illustrating an automobile (i.e., vehicle) 100, according to an example embodiment. The automobile 100 may be configured to operate fully or partially in an autonomous mode. The automobile 100 may further be configured to operate in the autonomous mode based on data obtained by at least one sensor. For example, in one embodiment, the automobile 100 may be operable to operate in an autonomous mode having at least one sensor coupled to the automobile 100 to obtain sensor data, and having a first pose in an environment. The automobile 100 may vary the first pose of the automobile 100 to create a second pose of the automobile 100, and the automobile 100 may determine a latency of the at least one sensor coupled to the automobile 100 based on one or more of the first pose of the automobile 100, the second pose of the automobile 100, and the sensor data.

The automobile 100 could include various subsystems such as a propulsion system 102, a sensor system 104, a control system 106, one or more peripherals 108, as well as a power supply 110, a computer system 112, and a user interface 116. The automobile 100 may include more or fewer subsystems and each subsystem could include multiple elements. Further, each of the subsystems and elements of automobile 100 could be interconnected. Thus, one or more of the described functions of the automobile 100 may be divided up into additional functional or physical components, or combined into fewer functional or physical components. In some further examples, additional functional and/or physical components may be added to the examples illustrated by FIG. 1.

The propulsion system 102 may include components operable to provide powered motion for the automobile 100. Depending upon the embodiment, the propulsion system 102 could include an engine/motor 118, an energy source 119, a transmission 120, and wheels/tires 121. The engine/motor 118 could be any combination of an internal combustion engine, an electric motor, steam engine, Stirling engine, or other types of engines and/or motors. In some embodiments, the engine/motor 118 may be configured to convert energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. That is, the engine/motor 118 could be configured to convert the energy source 119 into mechanical energy. Examples of energy sources 119 include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 119 could also provide energy for other systems of the automobile 100.

The transmission 120 could include elements that are operable to transmit mechanical power from the engine/motor 118 to the wheels/tires 121. To this end, the transmission 120 could include a gearbox, clutch, differential, and drive shafts. The transmission 120 could include other elements. The drive shafts could include one or more axles that could be coupled to the one or more wheels/tires 121.

The wheels/tires 121 of automobile 100 could be configured in various formats, including a unicycle, bicycle/motorcycle, tricycle, or car/truck four-wheel format. Other wheel/tire geometries are possible, such as those including six or more wheels. Any combination of the wheels/tires 121 of automobile 100 may be operable to rotate differentially with respect to other wheels/tires 121. The wheels/tires 121 could represent at least one wheel that is fixedly attached to the transmission 120 and at least one tire coupled to a rim of the wheel that could make contact with the driving surface. The wheels/tires 121 could include any combination of metal and rubber, or another combination of materials.

The sensor system 104 may include a plurality of sensors configured to sense information about an environment of the automobile 100. For example, the sensor system 104 could include a Global Positioning System (GPS) 122, an inertial measurement unit (IMU) 124, a RADAR unit 126, a laser rangefinder/LIDAR unit 128, and a camera 130. The sensor system 104 could also include sensors configured to monitor internal systems of the automobile 100 (e.g., $O_2$ monitor, fuel gauge, engine oil temperature). Other sensors are possible as well.

One or more of the sensors included in sensor system 104 could be configured to be actuated separately and/or collectively in order to modify a position and/or an orientation of the one or more sensors.

The GPS 122 may be any sensor configured to estimate a geographic location of the automobile 100. To this end, GPS 122 could include a transceiver operable to provide information regarding the position of the automobile 100 with respect to the Earth.

The IMU 124 could include any combination of sensors (e.g., accelerometers and gyroscopes) configured to sense position and orientation changes of the automobile 100 based on inertial acceleration.

The RADAR unit 126 may represent a system that utilizes radio signals to sense objects within the local environment of the automobile 100. In some embodiments, in addition to sensing the objects, the RADAR unit 126 may additionally be configured to sense the speed and/or heading of the objects.

Similarly, the laser rangefinder or LIDAR unit 128 may be any sensor configured to sense objects in the environment in which the automobile 100 is located using lasers. Depending upon the embodiment, the laser rangefinder/LIDAR unit 128 could include one or more laser sources, a laser scanner, and one or more detectors, among other system components. The laser rangefinder/LIDAR unit 128 could be configured to operate in a coherent (e.g., using heterodyne detection) or an incoherent detection mode.

The camera 130 could include one or more devices configured to capture a plurality of images of the environment of the automobile 100. The camera 130 could be a still camera or a video camera.

The control system 106 may be configured to control operation of the automobile 100 and its components. Accordingly, the control system 106 could include various elements include steering unit 132, throttle 134, brake unit 136, a sensor fusion algorithm 138, a computer vision system 140, a navigation/pathing system 142, and an obstacle avoidance system 144.

The steering unit 132 could represent any combination of mechanisms that may be operable to adjust the heading of automobile 100.

The throttle 134 could be configured to control, for instance, the operating speed of the engine/motor 118 and, in turn, control the speed of the automobile 100.

The brake unit 136 could include any combination of mechanisms configured to decelerate the automobile 100. The brake unit 136 could use friction to slow the wheels/tires 121. In other embodiments, the brake unit 136 could convert the kinetic energy of the wheels/tires 121 to electric current. The brake unit 136 may take other forms as well.

The sensor fusion algorithm 138 may be an algorithm (or a computer program product storing an algorithm) configured to accept data from the sensor system 104 as an input. The data may include, for example, data representing information sensed at the sensors of the sensor system 104. The sensor fusion algorithm 138 could include, for instance, a Kalman filter, Bayesian network, or other algorithm. The sensor fusion algorithm 138 could further provide various assessments based on the data from sensor system 104. Depending upon the embodiment, the assessments could include evaluations of individual objects and/or features in the environment of automobile 100, evaluation of a particular situation, and/or evaluate possible impacts based on the particular situation. Other assessments are possible.

The computer vision system 140 may be any system operable to process and analyze images captured by camera 130 in order to identify objects and/or features in the environment of automobile 100 that could include traffic signals, road way boundaries, and obstacles. The computer vision system 140 could use an object recognition algorithm, a Structure From Motion (SFM) algorithm, video tracking, and other computer vision techniques. In some embodiments, the computer vision system 140 could be additionally configured to map an environment, track objects, estimate the speed of objects, etc.

The navigation and pathing system 142 may be any system configured to determine a driving path for the automobile 100. The navigation and pathing system 142 may additionally be configured to update the driving path dynamically while the automobile 100 is in operation. In some embodiments, the navigation and pathing system 142 could be configured to incorporate data from the sensor fusion algorithm 138, the GPS 122, and one or more predetermined maps so as to determine the driving path for automobile 100.

The obstacle avoidance system 144 could represent a control system configured to identify, evaluate, and avoid or otherwise negotiate potential obstacles in the environment of the automobile 100.

The control system 106 may additionally or alternatively include components other than those shown and described.

Peripherals 108 may be configured to allow interaction between the automobile 100 and external sensors, other automobiles, and/or a user. For example, peripherals 108 could include a wireless communication system 146, a touchscreen 148, a microphone 150, and/or a speaker 152.

In an example embodiment, the peripherals 108 could provide, for instance, means for a user of the automobile 100 to interact with the user interface 116. To this end, the touchscreen 148 could provide information to a user of automobile 100. The user interface 116 could also be operable to accept input from the user via the touchscreen 148. The touchscreen 148 may be configured to sense at least one of a position and a movement of a user's finger via capacitive sensing, resistance sensing, or a surface acoustic wave process, among other possibilities. The touchscreen 148 may be capable of sensing finger movement in a direction parallel or planar to the touchscreen surface, in a direction normal to the touchscreen surface, or both, and may also be capable of sensing a level of pressure applied to the touchscreen surface. The touchscreen 148 may be formed of one or more translucent or transparent insulating layers and one or more translucent or transparent conducting layers. The touchscreen 148 may take other forms as well.

In other instances, the peripherals 108 may provide means for the automobile 100 to communicate with devices within its environment. The microphone 150 may be configured to receive audio (e.g., a voice command or other audio input) from a user of the automobile 100. Similarly, the speakers 152 may be configured to output audio to the user of the automobile 100.

In one example, the wireless communication system 146 could be configured to wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 could communicate with a wireless local area network (WLAN), for example, using WiFi. In some embodiments, wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short range communications (DSRC) devices that could include public and/or private data communications between vehicles and/or roadside stations.

The power supply 110 may provide power to various components of automobile 100 and could represent, for example, a rechargeable lithium-ion or lead-acid battery. In some embodiments, one or more banks of such batteries could be configured to provide electrical power. Other power supply materials and configurations are possible. In some embodiments, the power supply 110 and energy source 119 could be implemented together, as in some all-electric cars.

Many or all of the functions of automobile 100 could be controlled by computer system 112. Computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the automobile 100 in a distributed fashion.

In some embodiments, data storage 114 may contain instructions 115 (e.g., program logic) executable by the processor 113 to execute various automobile functions, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by automobile 100 and computer system 112 at during the operation of the automobile 100 in the autonomous, semi-autonomous, and/or manual modes.

The automobile 100 may include a user interface 116 for providing information to or receiving input from a user of automobile 100. The user interface 116 could control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the automobile 100 based on inputs received from various subsystems (e.g., propulsion system 102, sensor system 104, and control system 106), as well as from the user interface 116. For example, the computer system 112 may utilize input from the control system 106 in order to control the steering unit 132 to avoid an obstacle detected by the sensor system 104 and the obstacle avoidance system 144. Depending upon the embodiment, the computer system 112 could be operable to provide control over many aspects of the automobile 100 and its subsystems.

The components of automobile 100 could be configured to work in an interconnected fashion with other components within or outside their respective systems. For instance, in an example embodiment, the camera 130 could capture a plurality of images that could represent information about a state of an environment of the automobile 100 operating in an autonomous mode. The environment could include another vehicle. The computer vision system 140 could recognize the other vehicle as such based on object recognition models stored in data storage 114.

The computer system 112 may control the automobile 100 in an autonomous mode to operate at a first pose in an environment and obtain sensor data using at least one sensor of the automobile 100. For example, the computer system 112 may control the automobile 100 to cause the propulsion system 102 to cause the engine motor 118 to accelerate the automobile 100, and the control system 106 to cause the steering unit 132 to cause the automobile 100 to operate at a zero-degree heading. The computer system 112 may also control the automobile 100, to cause the sensor system 104 to cause the RADAR unit 126 to obtain sensor data. The computer system 112 may also vary the first pose of the vehicle to create a second pose of the vehicle. For example, the computer system 112 may control the automobile 100 to cause the steering unit 106 to cause the automobile 100 to operate at a twenty-degree northwest heading, thereby changing the original pose of the automobile 100. In the example embodiment, the computer system 112 may additionally make a determination regarding latency of the sensor based on one or more of the first pose of the vehicle, the second pose of the vehicle, and the sensor data. Other examples of interconnection between the components of automobile 100 are numerous and possible within the context of the disclosure.

Although FIG. 1 shows various components of automobile 100, i.e., wireless communication system 146, computer system 112, data storage 114, and user interface 116, as being integrated into the automobile 100, one or more of these components could be mounted or associated separately from the automobile 100. For example, data storage 114 could, in part or in full, exist separate from the automobile 100. Thus, the automobile 100 could be provided in the form of device elements that may be located separately or together. The device elements that make up automobile 100 could be communicatively coupled together in a wired and/or wireless fashion.

Figure 2:
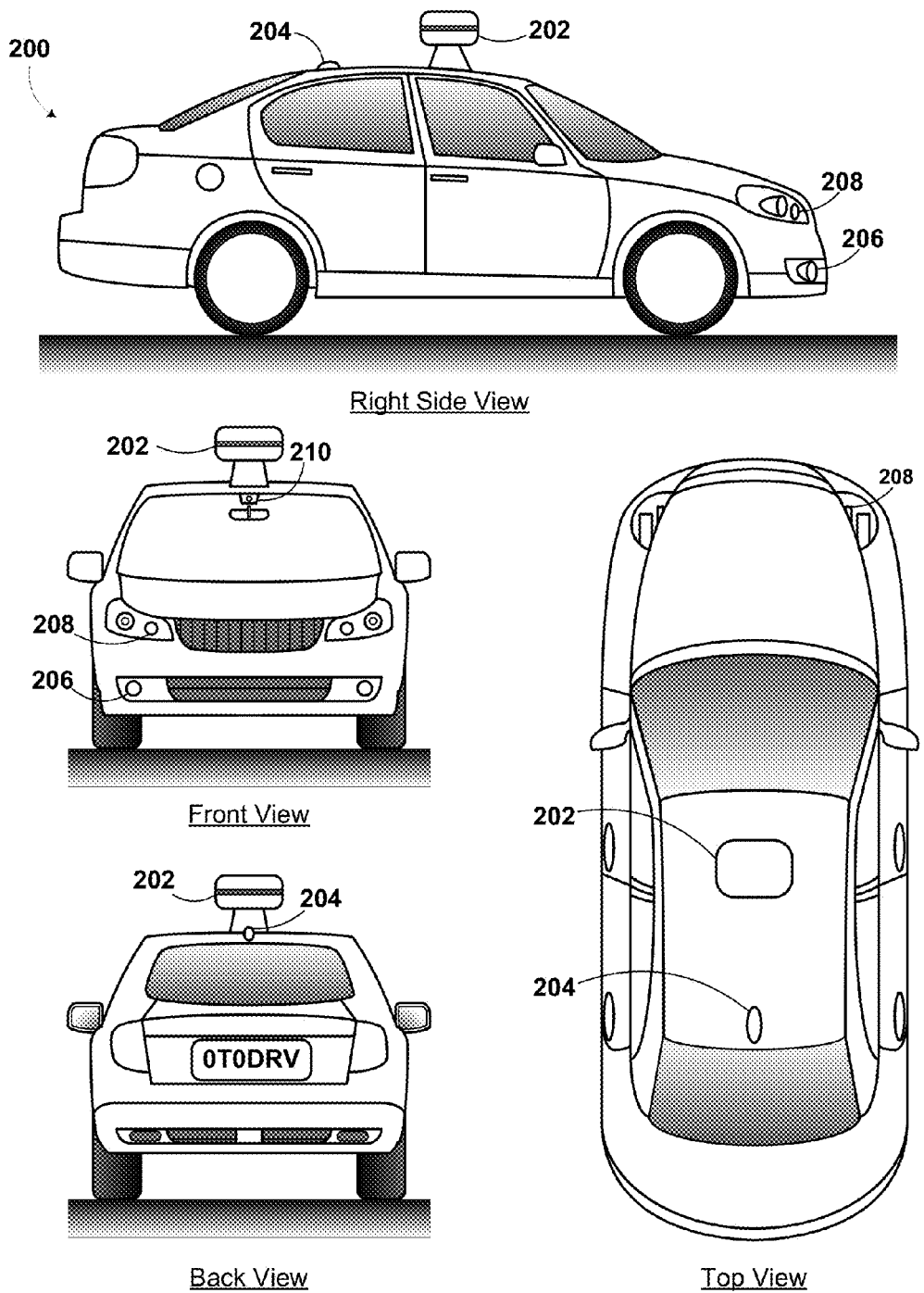
FIG. 2 is a vehicle, in accordance with an example embodiment.

FIG. 2 shows an automobile 200 that could be similar or identical to automobile 100 described in reference to FIG. 1. Although automobile 200 is illustrated in FIG. 2 as a car, other embodiments are possible. For instance, the automobile 200 could represent a truck, a van, a semi-trailer truck, a motorcycle, a golf cart, an off-road vehicle, or a farm vehicle, among other examples.

Depending on the embodiment, automobile 200 could include a sensor unit 202, a wireless communication system 204, a LIDAR unit 206, a laser rangefinder unit 208, and a camera 210. The elements of automobile 200 could include some or all of the elements described for FIG. 1.

The sensor unit 202 could include one or more different sensors configured to capture information about an environment of the automobile 200. For example, sensor unit 202 could include any combination of cameras, RADARs, LIDARs, range finders, and acoustic sensors. Other types of sensors are possible. Depending on the embodiment, the sensor unit 202 could include one or more movable mounts that could be operable to adjust the orientation of one or more sensors in the sensor unit 202. In one embodiment, the movable mount could include a rotating platform that could scan sensors so as to obtain information from each direction around the automobile 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include LIDAR unit 206 and laser rangefinder unit 208. Furthermore, each sensor of sensor unit 202 could be configured to be moved or scanned independently of other sensors of sensor unit 202.

The wireless communication system 204 could be located on a roof of the automobile 200 as depicted in FIG. 2. Alternatively, the wireless communication system 204 could be located, fully or in part, elsewhere. The wireless communication system 204 may include wireless transmitters and receivers that could be configured to communicate with devices external or internal to the automobile 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 may be any camera (e.g., a still camera, a video camera, etc.) configured to capture a plurality of images of the environment of the automobile 200. To this end, the camera 210 may be configured to detect visible light, or may be configured to detect light from other portions of the spectrum, such as infrared or ultraviolet light. Other types of cameras are possible as well.

The camera 210 may be a two-dimensional detector, or may have a three-dimensional spatial range. In some embodiments, the camera 210 may be, for example, a range detector configured to generate a two-dimensional image indicating a distance from the camera 210 to a number of points in the environment. To this end, the camera 210 may use one or more range detecting techniques. For example, the camera 210 may use a structured light technique in which the automobile 200 illuminates an object in the environment with a predetermined light pattern, such as a grid or checkerboard pattern and uses the camera 210 to detect a reflection of the predetermined light pattern off the object. Based on distortions in the reflected light pattern, the automobile 200 may determine the distance to the points on the object. The predetermined light pattern may comprise infrared light, or light of another wavelength. As another example, the camera 210 may use a laser scanning technique in which the automobile 200 emits a laser and scans across a number of points on an object in the environment. While scanning the object, the automobile 200 uses the camera 210 to detect a reflection of the laser off the object for each point. Based on a length of time it takes the laser to reflect off the object at each point, the automobile 200 may determine the distance to the points on the object. As yet another example, the camera 210 may use a time-of-flight technique in which the automobile 200 emits a light pulse and uses the camera 210 to detect a reflection of the light pulse off an object at a number of points on the object. In particular, the camera 210 may include a number of pixels, and each pixel may detect the reflection of the light pulse from a point on the object. Based on a length of time it takes the light pulse to reflect off the object at each point, the automobile 200 may determine the distance to the points on the object. The light pulse may be a laser pulse. Other range detecting techniques are possible as well, including stereo triangulation, sheet-of-light triangulation, interferometry, and coded aperture techniques, among others. The camera 210 may take other forms as well.

The camera 210 could be mounted inside a front windshield of the automobile 200. Specifically, as illustrated, the camera 210 could capture images from a forward-looking view with respect to the automobile 200. Other mounting locations and viewing angles of camera 210 are possible, either inside or outside the automobile 200.

The camera 210 could have associated optics that could be operable to provide an adjustable field of view. Further, the camera 210 could be mounted to automobile 200 with a movable mount that could be operable to vary a pointing angle of the camera 210.

Figure 3A:
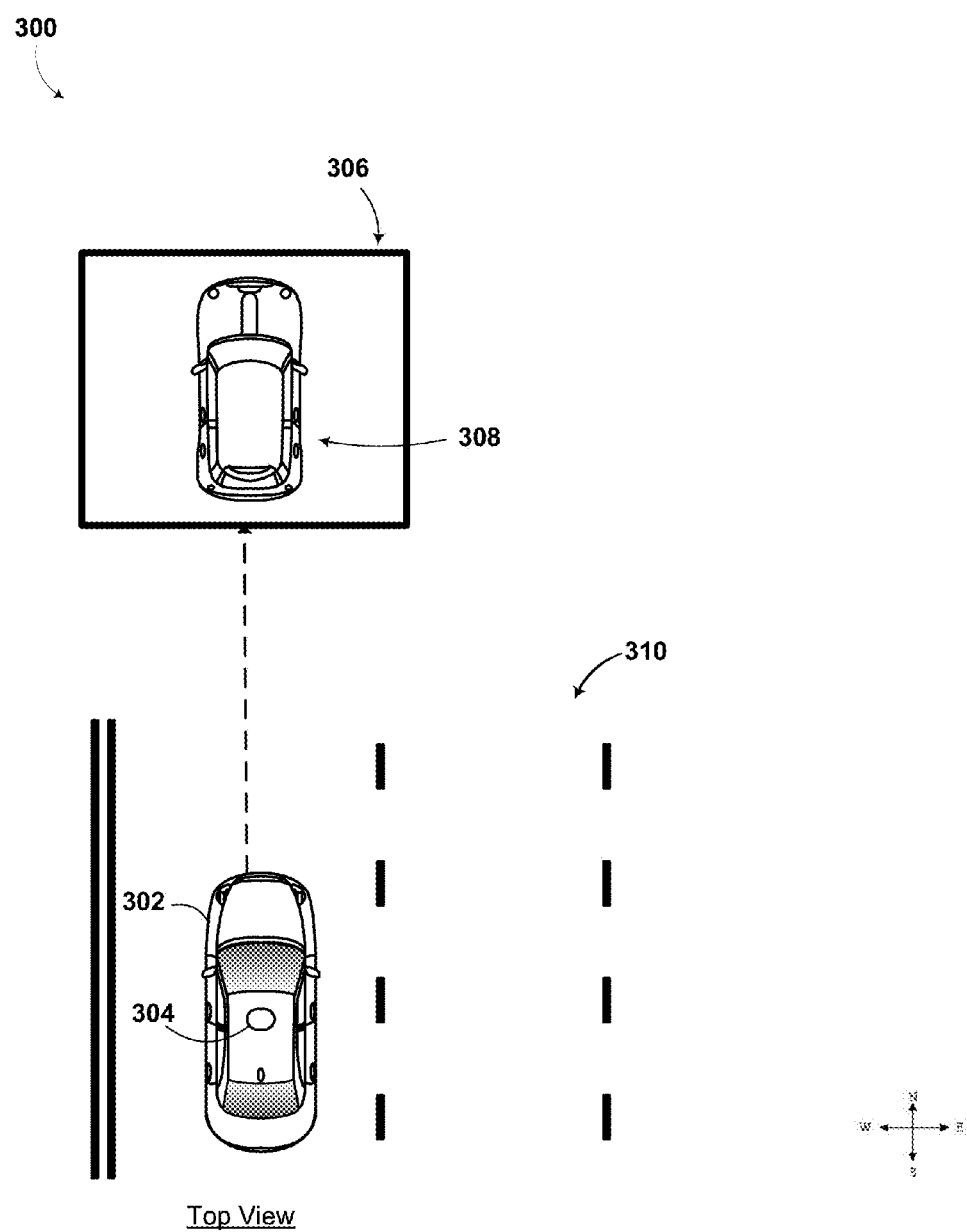
FIG. 3A is a top view of an autonomous vehicle operating scenario, in accordance with an example embodiment.

FIG. 3A illustrates a scenario 300 involving a freeway 310 and an automobile 302 operating in an autonomous mode during a test period having a first pose. For example, the automobile 302 may be traveling at a zero-degree heading at 50 miles-per-hour. Within the context of FIGS. 3A-3C the directional frame of reference is based on the standard four cardinal directions (north, east, south, and west); however, other directional reference frames are possible. The automobile 302 may operate at least one sensor of the sensor unit 304 to obtain sensor data. For example, the automobile may operate the camera 130 of the sensor unit 304 of the automobile 302 allowing the automobile to capture images of an environment of the automobile 302. Other sensors may be operated by the automobile 302. The sensor data may include detecting the presence and capturing images of car 308, for example. The car 308 may be captured in a frame-of-reference 306, for example. The sensor data may also include video captured by the camera 130 of the automobile 302, for example.

The automobile 302 may determine a need to vary its pose to a second pose (a new pose) as it continues to operate. The new pose may be based on activity of the car 308 or other objects within the environment (not shown), for example. For example, the computer system of the automobile 302 may determine the automobile 302 needs to change heading to negative fifteen-degrees northeast and decelerate to 40 miles-per-hour in attempt to change lanes to avoid car 308. In other scenarios, the automobile 302 may simply determine to change its pose without a particular need. Based on the defined movement, the automobile 302 may determine a predicted movement of car 308 within the sensor data as perceived by its sensor (i.e., camera 130). For example, the automobile 302 may determine that car 308 will move in west lateral direction within the sensor data captured by camera 130 as the automobile initiates and completes its defined movement (shown in FIG. 3B). The movement of car 308 in the west lateral direction may be the predicted movement.

Once the automobile 302 has determined its defined movement and predicted a movement of car 308, the automobile may initiate and complete the defined movement at an initiation time and a completion time, respectively. For example, the computer system of the automobile 302 may cause, using the propulsion system and the control system, the automobile 302 to begin to change heading to negative fifteen-degrees northeast and decelerate to 40 miles-per-hour in attempt to change lanes.

Figure 3B:
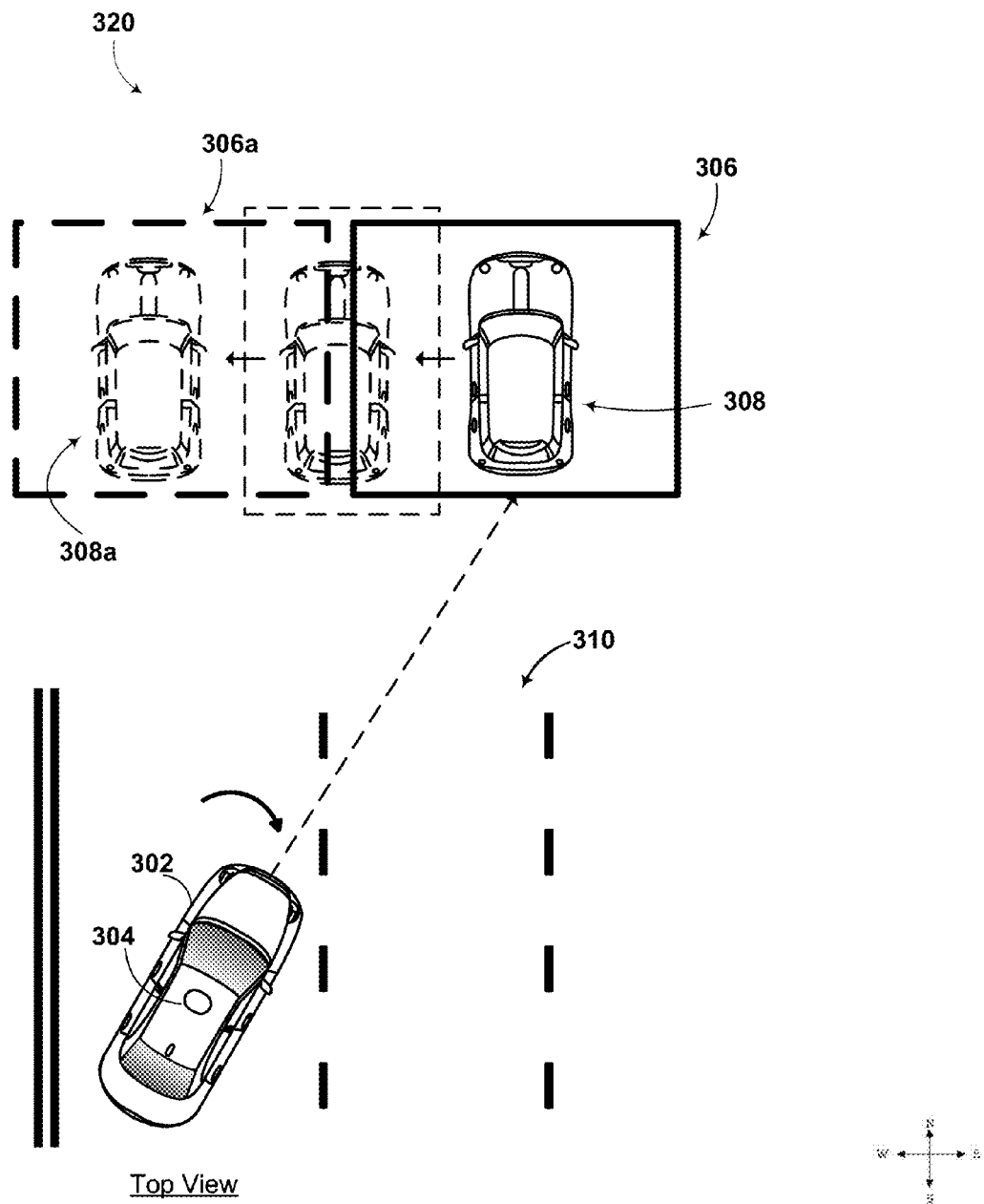
FIG. 3B is a top view of an autonomous vehicle operating scenario, in accordance with an example embodiment.

FIG. 3B illustrates a scenario 320 similar to that in FIG. 3A, but later in time. In FIG. 3B, the automobile 302 has completed its defined movement and is operating in its second pose. Operating in the second pose the sensor unit 304 may cause the operating sensor of the automobile 302 to re-detect or update. New sensor data may be obtained. For example, as the automobile 302 moves in the defined manner (i.e., defined movement) the camera 130 may begin to perceive the car 308 move in the predicted manner. In other examples, the camera 130 of the automobile 302 may still recognize car 308 as being in its frame-of-reference 306 directly in front of the automobile 302. However, after camera 130 of automobile 302 re-initializes it may begin to detect car 308 move in the predicted west lateral direction opposite to that of its new heading (i.e., defined movement) to reflect where the car 308 actually is in reference to the new pose of the automobile 302. Once the camera 130 re-initializes, the camera 130 may capture data reflecting movement of the car 308. The data may include video or images, for example. In FIG. 3B this is depicted as car 308 in frame-of-reference 306 moving west to a final position indicated as 306a and 308a.

Once the data has been captured by the camera 130, the automobile 302 may analyze the sensor data to identify a start time when the car 308 began to move in the predicted manner, and a stop time when the car 308 stopped or completed the predicted movement. This may be performed by the computer system of the automobile 302, for example, by analyzing the different images (i.e., sensor data) obtained by the camera 130 to determine whether (i) there was change in position of the car 308 in the predicted manner in the images obtained by the camera, and (ii) if so, at what time the change occurred. The time may be obtained, for example, by recording the time the data was obtained. Other methods may exist to determine a start time and a stop time.

Figure 3C:
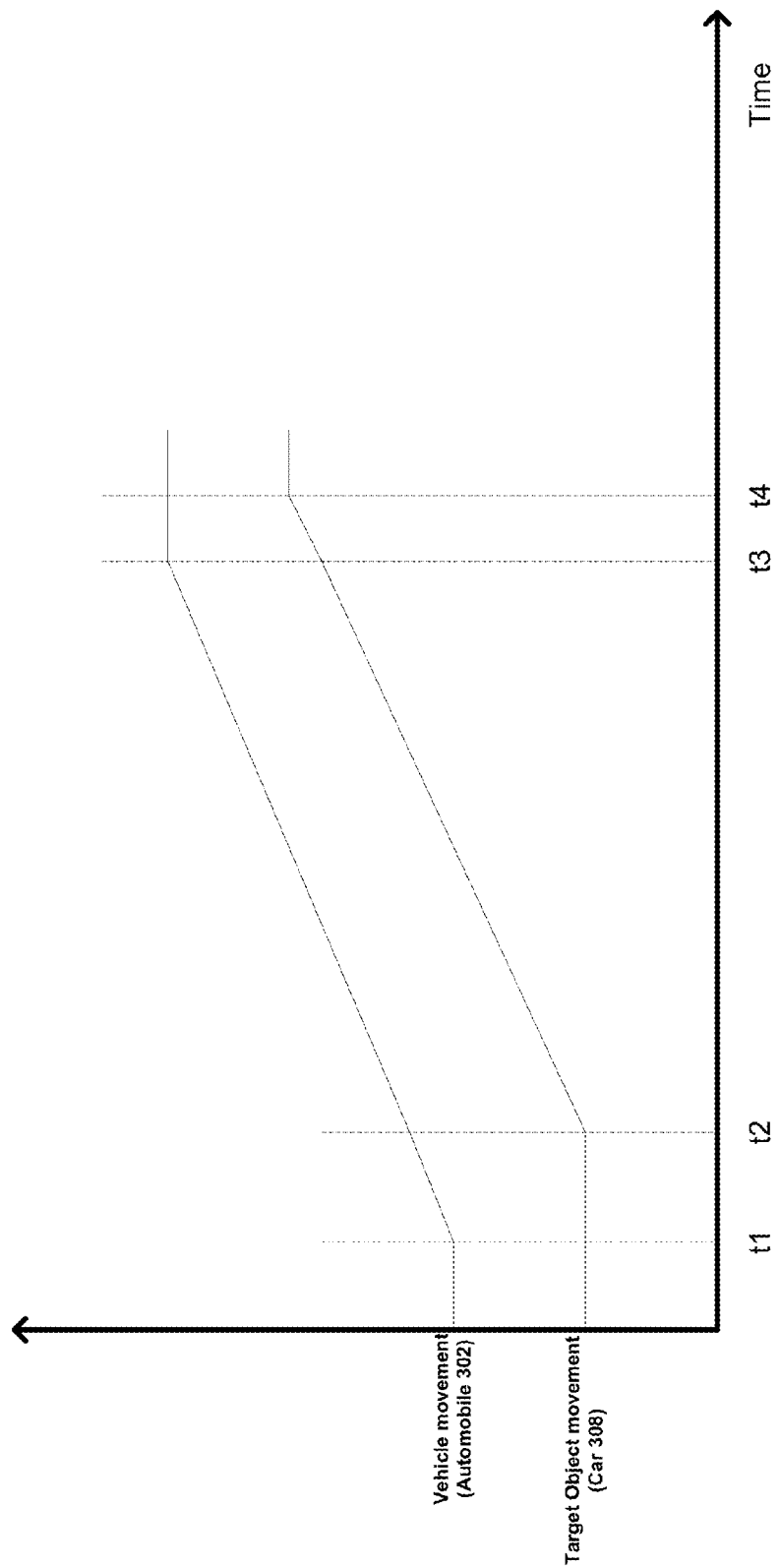
FIG. 3C illustrates a data time line, according to an example embodiment.

FIG. 3C illustrates a time line such as, for example, the scenario depicted in FIGS. 3A and 3B. FIG. 3C may be created as a result of automobile 302 analyzing the data obtained by camera 130, for example. As depicted, the automobile begins (or initiates) its defined movement at time t1. In other words, this would be the time at which the automobile 302 begins to change its heading to negative fifteen-degrees northeast and decelerate to 40 miles-per-hour in attempt to change lanes. Time t2 represents the start time of the movement of the car 308 as perceived by the sensor of the automobile 306, or in other words t2 represents the time at which car 308 begins to move in a lateral west direction as detected by camera 130. Time t3 represents the completion time of the defined movement of the vehicle 302, and time t4 represents the stop time of the movement of the car 308 as perceived by the camera 130 (i.e., movement in the sensor data). The times t1, t2, t3, and t4 may be measured in seconds for example. Other time measurements may be used.

Figure 4:
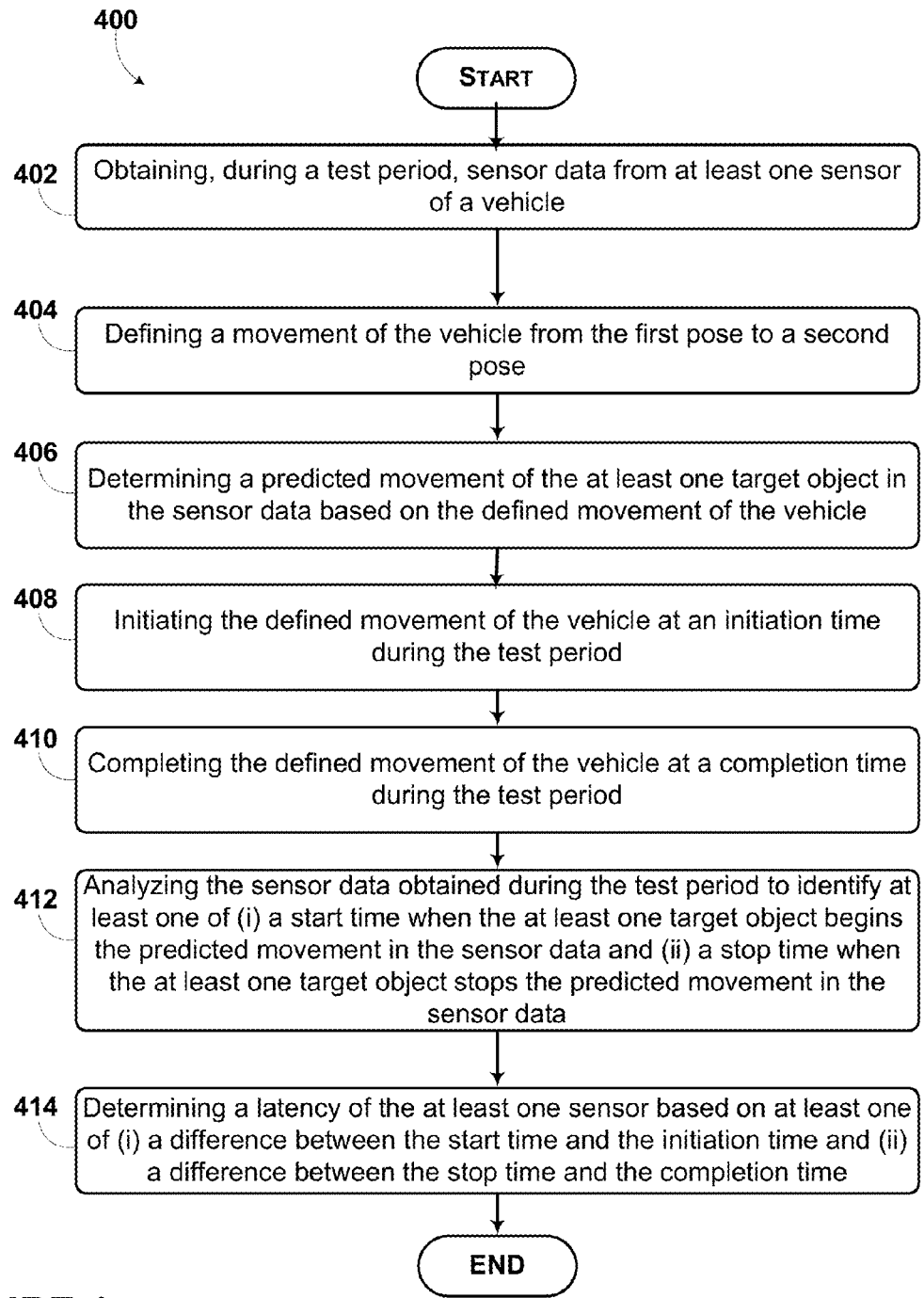
FIG. 4 is a block diagram of a method, in accordance with an example embodiment.

Based on the initiation time and completion time of the automobile 302, and the start time and the stop time of the car 308, the automobile 302 may determine a latency of the camera 130 based on at least one of (i) a difference between the start time and the initiation time and (ii) a difference between the stop time and the completion time. Referring to FIG. 4, the latency of camera 130 of automobile 302 could be calculated based on be the difference between t1 and t2, or the difference between t3 and t4. One or both of these calculations may be used to determine the latency. Other calculations may also be used to better determine the latency. In some examples, an average of the differences may be used. In other examples, a range of differences may be obtained and analyzed.

Figure 3D:
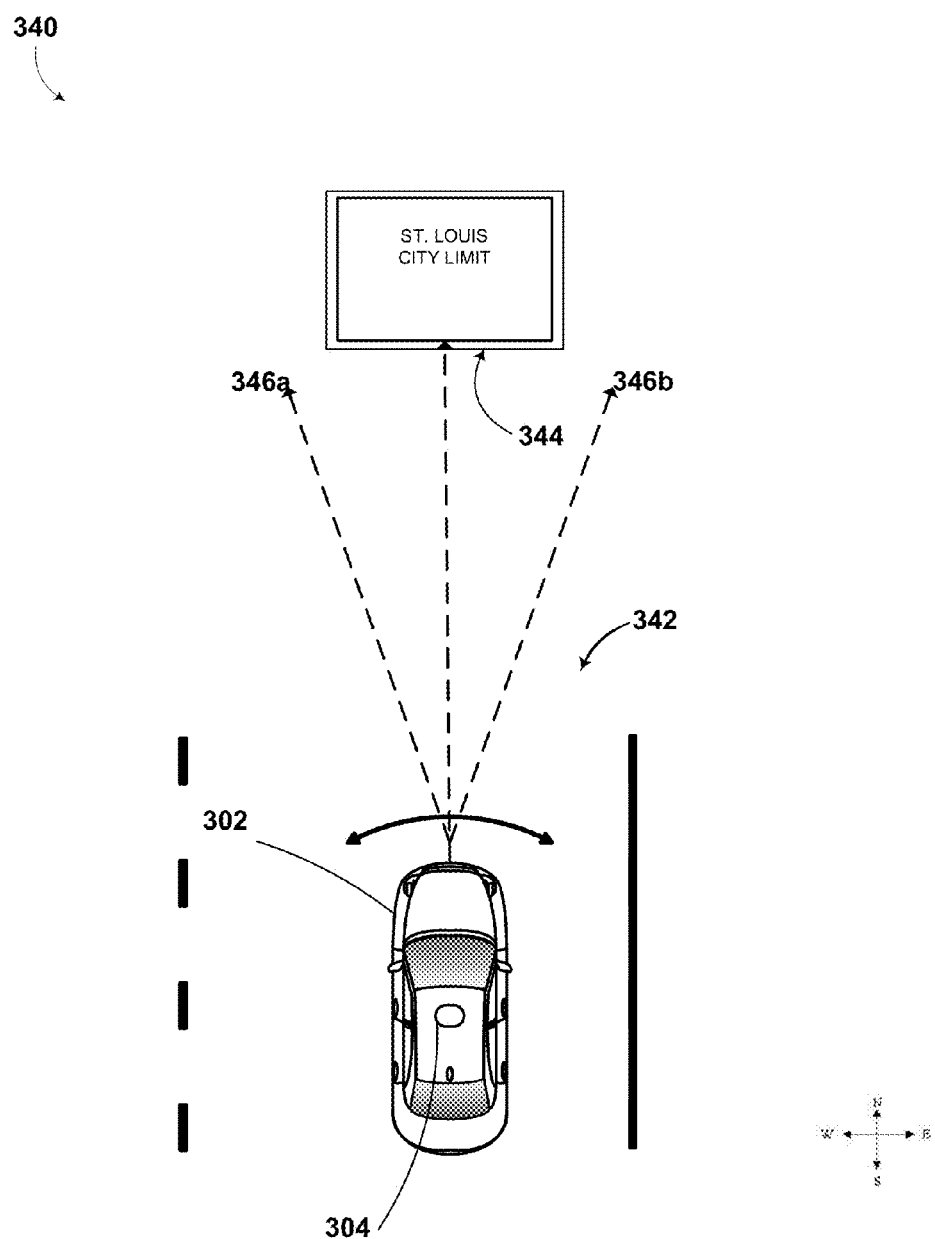
FIG. 3D is a top view of an autonomous vehicle operating scenario, in accordance with an example embodiment.

FIG. 3D illustrates a scenario 340 similar to FIGS. 3A and 3B. In FIG. 3D, automobile 302 is travelling in a lane 342 on a freeway operating in the same pose (a first pose) as it was in FIG. 3A, travelling at 50 miles-per-hour at a zero-degree north heading during a test period. The automobile 302 may operate the sensor unit 304 to obtain sensor data. In this example, the automobile 302 may operate LIDAR unit 128 allowing the automobile to sense objects in the environment of the automobile 302. For example, the LIDAR unit 128 may sense a highway sign 344 at a distance. The automobile 302 may use other sensors to recognize and interpret the highway sign 344.

Similar to the scenario in FIGS. 3A and 3B, the automobile 302 may define a movement of the vehicle from a first pose to a second pose as it continues to operate. In this instance, the defined movement may be to create a small perturbation, potentially undetectable by a user, to the yaw of the automobile 302. The perturbation to the yaw is indicated by the arrow in the Figure. In other scenarios, the perturbation to the yaw may be noticeable by a user. Like the scenario in FIG. 3B, the automobile 302 may predict a movement of an object on the freeway, here a highway sign 344, as perceived by the LIDAR unit 128. The predefined movement may be a lateral movement opposite to the perturbation of the yaw. The automobile 302 may then initiate and complete the defined movement by causing the computer system to create a small perturbation to the yaw of the vehicle, and stop causing perturbations from being applied to the yaw of the vehicle. As the automobile initiates and completes the defined movement, the LIDAR unit 128 of the automobile 302 may sense lateral movement of the highway sign 344 corresponding to the yaw change. The automobile 302 may analyze sensor data obtained by the LIDAR unit 128 of the automobile 302 to determine a start time and a stop time of the predicted movement of the highway sign 344. Based on the initiation time and the start time and/or the stop time and the completion time, the latency of the LIDAR unit 128 may be determined.

A method 400 is provided for determining the latency of at least one sensor of a vehicle configured to operate in an autonomous mode. The method could be performed using the apparatus shown in FIGS. 1 and 2 and described above; however, other configurations could be used. FIG. 4 illustrates the steps in an example method, however, it is understood that in other embodiments, the steps may appear in a different order, and steps could be added or subtracted.

Step 402 includes obtaining, during a test period, sensor data from at least one sensor of a vehicle. The vehicle described in this method may be the automobile 100 and/or automobile 200 as illustrated and described in reference to the FIGS. 1 and 2, respectively, and will be referenced as such in discussing method 400. Operating an automobile having at least one sensor may include, for example, operating any of the sensors included in the sensor system 104. The automobile may operate in an autonomous mode controlled by a computer system during the test period. The test period may be any finite period of time. The sensor data may include data representative of a target object in an environment of the automobile, and the automobile may have a first pose in the environment at a beginning of the test period. For example, the target object may be another vehicle, a pedestrian, or a street sign, and the automobile may be traveling at a zero-degree-north heading.

Step 404 includes defining a movement of the vehicle from the first pose to a second pose. In other words, the computer system may control the automobile to define a movement of the automobile that will cause the automobile to operate in a pose that is different than the first pose of the automobile that the automobile was previously operating in. The computer system may define the movement to include a change in speed, acceleration, deceleration heading and/or yaw, for example.

Step 406 includes determining a predicted movement of the at least one target object in the sensor data based on the defined movement of the vehicle. The computer system of the automobile may predict a movement of a target object in the sensor data based on any defined movement of the automobile. In other words, the computer system may predict the movement of the at least one target object by predicting how the at least one target object will move, as perceived by the at least one sensor of the automobile continues to detect and obtain new sensor data.

Step 408 includes initiating the defined movement of the vehicle at an initiation time during the test period, and Step 410 includes completing the defined movement of the vehicle at a completion time during the test period. The computer system may use any of the various subsystems to cause the automobile to initiate and complete the defined movement. For example, if the defined movement includes acceleration, the computer system of the automobile may cause the propulsion system to accelerate the automobile, and upon reaching the desired acceleration cause the automobile to stop accelerating.

Step 412 includes analyzing the sensor data obtained during the test period to identify at least one of (i) a start time when the at least one target object begins the predicted movement in the sensor data and (ii) a stop time when the at least one target object stops the predicted movement in the sensor data. Such analysis may be performed as described with respect to FIG. 4, for example. Other examples may include plotting each movement of the automobile and the target object and comparing the plots. Moreover, other possibilities exist for data that could be used to determine a latency of a sensor coupled to the automobile. For example, the sensor data may be analyzed to determine a rate at which the determined movement was executed, and determine a rate at which the target object moved within the sensor data, instead of focusing on the time at which the automobile is moving and the time at which the target is moving.

Step 414 includes determining a latency of the at least one sensor based on at least one of (i) a difference between the start time and the initiation time and (ii) a difference between the stop time and the completion time. This determination may be made, for example, by the computer system of the automobile. When other data is used, for example the data capturing the rate of movement of the automobile and the rate of movement of target object within the sensor data, the latency may be determined on that basis.

Example methods, such as method 400 of FIG. 4 may be carried out in whole or in part by the automobile and its subsystems. Accordingly, example methods could be described by way of example herein as being implemented by the automobile. However, it should be understood that an example method may be implemented in whole or in part by other computing devices. For example, an example method may be implemented in whole or in part by a server system, which receives data from a device such as those associated with the automobile. Other examples of computing devices or combinations of computing devices that can implement an example method are possible.

Figure 5:
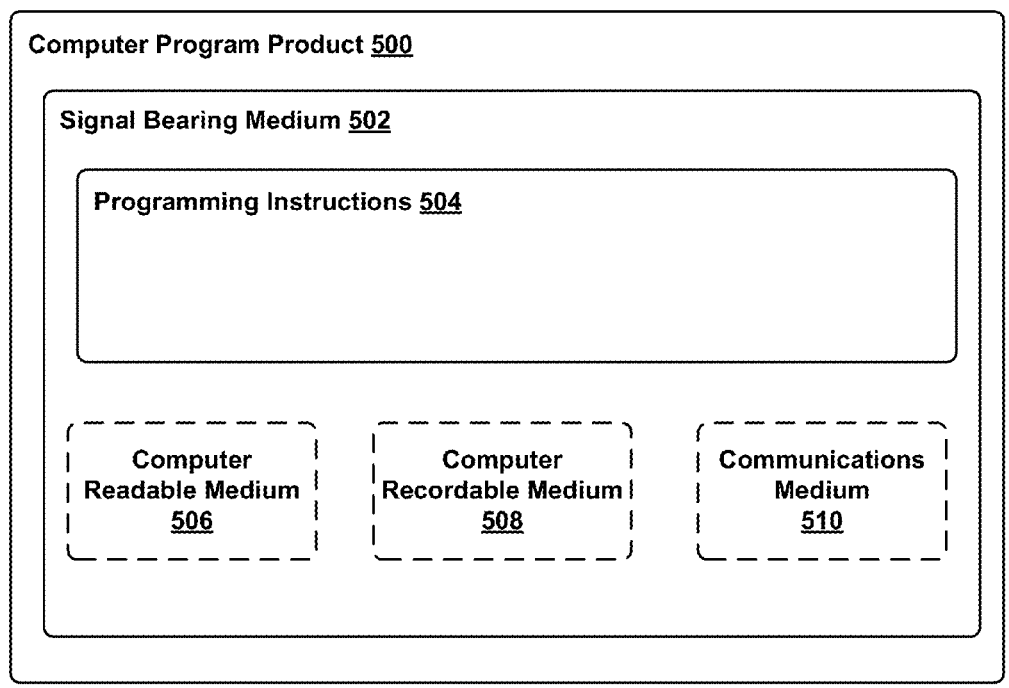
FIG. 5 is a schematic diagram of a computer program product, according to an example embodiment.

In some embodiments, the disclosed methods may be implemented as computer program instructions encoded on a non-transitory computer-readable storage media in a machine-readable format, or on other non-transitory media or articles of manufacture. FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 502. The signal bearing medium 502 may include one or more programming instructions 504 that, when executed by one or more processors may provide functionality or portions of the functionality described above with respect to FIGS. 1-4. In some examples, the signal bearing medium 502 may encompass a computer-readable medium 506, such as, but not limited to, a hard disk drive, a Compact Disc (CD), a Digital Video Disk (DVD), a digital tape, memory, etc. In some implementations, the signal bearing medium 502 may encompass a computer recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, the signal bearing medium 502 may be conveyed by a wireless form of the communications medium 510.

The one or more programming instructions 504 may be, for example, computer executable and/or logic implemented instructions. In some examples, a computing device such as the computer system 112 of FIG. 1 may be configured to provide various operations, functions, or actions in response to the programming instructions 504 conveyed to the computer system 112 by one or more of the computer readable medium 506, the computer recordable medium 508, and/or the communications medium 510.

The non-transitory computer readable medium could also be distributed among multiple data storage elements, which could be remotely located from each other. The computing device that executes some or all of the stored instructions could be an automobile, such as the automobile 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments are possible. The various aspects and embodiments disclosed herein are for purposes of illustration and are not intended to be limiting, with the true scope and spirit being indicated by the following claims.

The invention claimed is:

1. A method comprising:
obtaining, during a test period, sensor data from at least one sensor of a vehicle, wherein the vehicle is operating in an autonomous mode controlled by a computer system during the test period, wherein the sensor data includes data representative of a target object in an environment of the vehicle, and wherein the vehicle has a first pose in the environment at a beginning of the test period;
defining a movement of the vehicle from the first pose to a second pose;
determining a predicted movement of the at least one target object in the sensor data based on the defined movement of the vehicle;
initiating the defined movement of the vehicle at an initiation time during the test period;
completing the defined movement of the vehicle at a completion time during the test period;
analyzing the sensor data obtained during the test period to identify at least one of (i) a start time when the at least one target object begins the predicted movement in the sensor data and (ii) a stop time when the at least one target object stops the predicted movement in the sensor data; and
determining a latency of the at least one sensor based on at least one of (i) a difference between the start time and the initiation time and (ii) a difference between the stop time and the completion time.

2. The method of claim 1, wherein the first pose and the second pose comprise at least one of a speed, a heading, an acceleration, a deceleration, and a yaw rate.

3. The method of claim 2, wherein defining the movement of the vehicle from the first pose to the second pose comprises defining one or more of the speed, the heading, the acceleration, the deceleration, and the yaw rate.

4. The method of claim 3, wherein initiating the defined movement of the vehicle at the initiation time during the test period comprises automatically changing one or more of the speed to be the defined speed, the heading to be the defined heading, the acceleration to be the defined acceleration, the deceleration to be the defined deceleration, and the yaw rate to be the defined yaw rate.

5. The method of claim 2, wherein
defining the movement of the vehicle from the first pose to a second pose comprises defining the heading;
determining the predicted movement of the at least one target object in the sensor data based on the defined movement of the vehicle comprises determining the predicted movement of the at least one target object in the sensor data to be a lateral movement in a direction opposite to the defined heading of the vehicle; and
initiating the defined movement of the vehicle at the initiation time during the test period comprises automatically changing the heading of the vehicle to the defined heading.

6. The method of claim 5, wherein the at least one sensor comprises a laser rangefinder.

7. The method of claim 5, wherein the at least one sensor comprises a camera.

8. The method of claim 5, wherein the at least one sensor comprises a radar.

9. A vehicle comprising:
at least one sensor, coupled to the vehicle, configured to acquire sensor data during a test period, wherein the vehicle is configured to operate in an autonomous mode during the test period, wherein the sensor data includes data representative of a target object in an environment of the vehicle, and wherein the vehicle has a first pose in the environment at a beginning of the test period; and
a computer system, wherein the computer system is configured to:
operate the at least one sensor and the vehicle in the autonomous mode to obtain the sensor data;
define a movement of the vehicle from the first pose to a second pose;
determine a predicted movement of the at least one target object in the sensor data based on the defined movement of the vehicle;
initiate the defined movement of the vehicle at an initiation time during the test period;
complete the defined movement of the vehicle at a completion time during the test period;
analyze the sensor data obtained during the test period to identify at least one of (i) a start time when the at least one target object begins the predicted movement in the sensor data and (ii) a stop time when the at least one target object stops the predicted movement in the sensor data; and
determine a latency of the at least one sensor based on at least one of (i) a difference between the start time and the initiation time and (ii) a difference between the stop time and the completion time.

10. The vehicle of claim 9, wherein the first pose and the second pose comprise at least one of a speed, a heading, an acceleration, a deceleration, and a yaw rate.

11. The vehicle of claim 10, wherein defining the movement of the vehicle from the first pose to the second pose comprises defining one or more of the speed, the heading, the acceleration, the deceleration, and the yaw rate.

12. The vehicle of claim 11, wherein initiating the defined movement of the vehicle at the initiation time during the test period comprises automatically changing one or more of the speed to be the defined speed, the heading to be the defined heading, the acceleration to be the defined acceleration, the deceleration to be the defined deceleration, and the yaw rate to the defined yaw rate.

13. The vehicle of claim 10, wherein
defining the movement of the vehicle from the first pose to a second pose comprises defining the heading;
determining the predicted movement of the at least one target object in the sensor data based on the defined movement of the vehicle comprises determining the predicted movement of the at least one target object in the sensor data to be a lateral movement in a direction opposite to the defined heading of the vehicle; and
initiating the defined movement of the vehicle at the initiation time during the test period comprises automatically changing the heading of the vehicle to the defined heading.

14. The vehicle of claim 13, wherein the at least one sensor comprises a laser rangefinder, a camera, or a radar.

15. A non-transitory computer readable medium having stored therein instructions executable by a computer system to cause the computer system to perform functions comprising:
obtaining, during a test period, sensor data from at least one sensor of a vehicle, wherein the vehicle is operating in an autonomous mode during the test period, wherein the sensor data includes data representative of a target object in an environment of the vehicle, and wherein the vehicle has a first pose in the environment at a beginning of the test period;
defining a movement of the vehicle from the first pose to a second pose;
determining a predicted movement of the at least one target object in the sensor data based on the defined movement of the vehicle;
initiating the defined movement of the vehicle at an initiation time during the test period;
completing the defined movement of the vehicle at a completion time during the test period;
analyzing the sensor data obtained during the test period to identify at least one of (i) a start time when the at least one target object begins the predicted movement in the sensor data and (ii) a stop time when the at least one target object stops the predicted movement in the sensor data; and
determining a latency of the at least one sensor based on at least one of (i) a difference between the start time and the initiation time and (ii) a difference between the stop time and the completion time.

16. The non-transitory computer readable medium of claim 15, wherein the first pose and the second pose comprise at least one of a speed, a heading, an acceleration, a deceleration, and a yaw rate.

17. The non-transitory computer readable medium of claim 16, wherein the instructions are further executable by the computing device to perform functions comprising defining one or more of the speed, the heading, the acceleration, the deceleration, and the yaw rate.

18. The non-transitory computer readable medium of claim 17, wherein the instructions are further executable by the computing device to perform functions comprising automatically changing one or more of the speed to be the defined speed, the heading to be the defined heading, the acceleration to be the defined acceleration, the deceleration to be the defined deceleration, and the yaw rate to be the defined yaw rate.

19. The non-transitory computer readable medium of claim 16, wherein the instructions are further executable by the computing device to perform functions comprising:
defining the heading;

determining the predicted movement of the at least one target object in the sensor data to be a lateral movement in a direction opposite to the defined heading of the vehicle; and automatically changing the heading of the vehicle to the defined heading.

20. The non-transitory computer readable medium of claim 19, wherein the at least one sensor comprises a laser rangefinder, a camera, or a radar.

* * * * *